United States Patent
Coward et al.

(10) Patent No.: US 7,659,340 B2
(45) Date of Patent: Feb. 9, 2010

(54) LOW VOC UNIVERSAL PAINT COLORANT COMPOSITIONS

(75) Inventors: Mark Randall Coward, Jeffersonville, IN (US); Stephen M. Korenkiewicz, Prospect, KY (US); David R. Wallace, Louisville, KY (US)

(73) Assignee: Valspar Sourcing, Inc., Minneapolis, MN (US)

( * ) Notice: Subject to any disclaimer, the term of this patent is extended or adjusted under 35 U.S.C. 154(b) by 270 days.

(21) Appl. No.: 11/384,176

(22) Filed: Mar. 17, 2006

(65) Prior Publication Data

US 2006/0207476 A1 Sep. 21, 2006

Related U.S. Application Data

(60) Provisional application No. 60/663,040, filed on Mar. 18, 2005.

(51) Int. Cl.
C09C 1/04 (2006.01)
C09C 1/22 (2006.01)
C09C 1/36 (2006.01)
C09C 1/44 (2006.01)
C09C 1/48 (2006.01)

(52) U.S. Cl. ............... 524/599; 106/447; 106/499; 106/504; 106/477; 106/460; 106/476; 106/493; 106/494; 106/495; 106/496

(58) Field of Classification Search ............ 524/599; 106/447, 499, 504, 477, 460, 476, 493
See application file for complete search history.

(56) References Cited

U.S. PATENT DOCUMENTS

| | | | |
|---|---|---|---|
| 2,878,135 | A | 3/1959 | Willis |
| 4,089,699 | A | 5/1978 | Blackburn et al. |
| 5,814,144 | A | 9/1998 | Coutts et al. |
| 6,020,407 | A | 2/2000 | Campbell et al. |
| 6,287,377 | B1 * | 9/2001 | Binns et al. ............. 106/499 |
| 6,448,366 | B1 | 9/2002 | Santhanam et al. |
| 6,488,760 | B1 * | 12/2002 | Binns et al. ............. 106/499 |
| 2005/0039635 | A1 * | 2/2005 | Yang et al. ............. 106/31.89 |
| 2005/0080171 | A1 * | 4/2005 | Reisacher et al. ......... 524/115 |
| 2007/0055001 | A1 | 3/2007 | Geurtsen et al. |
| 2007/0055002 | A1 | 3/2007 | Campbell et al. |
| 2007/0244246 | A1 | 10/2007 | Paczkowski et al. |

FOREIGN PATENT DOCUMENTS

| | | |
|---|---|---|
| DE | 102 04 583 A1 | 8/2003 |
| WO | WO 93/09187 A | 5/1993 |
| WO | WO 03/066743 A | 8/2003 |
| WO | WO 2006/047238 A2 | 5/2006 |
| WO | WO 2007/030382 A2 | 3/2007 |
| WO | WO 2007/030626 A2 | 3/2007 |

OTHER PUBLICATIONS

International Search Report from PCT/US2006/009581.
Wehrens, H., "Solving the "Viscosity Drop" Issue through Colorant Technology", Presented Oct. 2006 Meeting.
"Sokalan® Tamol® Water-soluble Polymers and Additives" brochure, Nov. 2004, 6 pages.
"BASF Tamol® product list" p. printed on Jul. 30, 2009 from website: http://worldaccount.basf.com/wa/Eu~en_GB/Catalog/Chemicals/pi/BASF/Brand /tamol/brand_top/.
Rohm and Haas Company Architectural Coatings, "General Guidelines for Dispersant Use", 4 pages, Jun. 1994.
Rohm and Haas Company, "Tamol™ Dispersants" product list page printed on Jul. 30, 2009 from website: http://www.rohmhaas.com/wcm/products/product_line_detail.page?product-line=1120071&application=&display-mode=highlight&region=NAR&start.
Rohm and Haas Company, "Tamol™ 165A" product description page printed on Jul. 30, 2009 from website: http://www.rohmhaas.com/wcm/products/product_detail.page?product-line=1120071&product=1120360&application =.
Rohm and Haas Company, "Tamol™ 681" product description page printed on Jul. 30, 2009 from website: http://www.rohmhaas.com/wcm/products/product_detail.page?product-line=1120071&product=1123147&application =.
Rohm and Haas Company "Tamol™ 731A" product description page printed on Jul. 30, 2009 from website: http://www.rohmhaas.com/wcm/products/product_detail.page?product-line=1120071&product=1121933&application=.
Rohm and Haas Company, "Tamol™ 1124" product description page printed from on Jul. 30, 2009 from website: http://www.rohmhaas.com/wcm/products/product_detail.page?product-line=1120071&product=1123293&application.
US 5,841,144, 11/1998, Cresswell (withdrawn)

* cited by examiner

*Primary Examiner*—Mark Eashoo
*Assistant Examiner*—Noah Frank
(74) *Attorney, Agent, or Firm*—IPLM Group, P.A.

(57) ABSTRACT

A universal colorant composition for both solvent- and water-based paints and coatings includes a colorant component, such as pigment, dye, colorant, tinting agent and/or metal effect agent; a surfactant package including at least one alkyd-compatible; surfactant and at least one latex-compatible surfactant; and a carrier. When the surfactant package is added to a base paint it provides a mixture having a drop in viscosity of less than about 50%.

34 Claims, No Drawings

LOW VOC UNIVERSAL PAINT COLORANT COMPOSITIONS

CROSS-REFERENCE TO RELATED APPLICATION

This application claims priority from U.S. provisional patent application Ser. No. 60/663,040, filed Mar. 18, 2005, which is incorporated herein by reference.

BACKGROUND

Paints and coatings are often used to protect a surface from corrosion, oxidation or other types of deterioration and to provide decorative effects.

An organic solvent-based (alkyd) paint or coating is a uniformly dispersed mixture ranging in viscosity from a thin liquid to a semi-solid paste and includes a film-forming polymeric binder, an organic solvent, pigment and other additives. The binder and the solvent collectively make what is known as the "vehicle."

A latex or emulsion paint or coating is a uniformly dispersed mixture ranging in viscosity from a thin liquid to a semi-solid paste and includes a film-forming polymeric binder, water (solvent), pigment and other additives. The binder and the solvent collectively make what is known as the "vehicle." Latex paints and coatings are popular consumer paints, as they are easy to apply, are usually easy to clean up, nonflammable, generally lack a disagreeable odor and can be used on both interior and exterior surfaces.

Pigments impart color to both alkyd and latex paints and coatings. They also can contribute to the opacity, durability and hardness of paint coatings. They can be added to paint in the form of dry pigment powders and/or pigmented tinting concentrate, e.g., a colorant composition, during paint manufacture at the paint plant. In addition, especially for consumer latex paints, they may be added in the form of pigmented paint tinting concentrates at the point of sale, such as at retail paint stores. Essentially, the consumer may choose a custom-made color of the paint by having the retailer add a colorant composition to a white or tintable base.

Pigments are ordinarily organic or inorganic dry powders that incorporate a mixture of primary particles, aggregates and agglomerates. Aggregates are primary pigment particles joined face-to-face, and agglomerates are primary pigment particles joined at an edge or a corner. For both industrial and consumer paints, whether solvent- or latex-based, the pigment preferably should be dispersed homogeneously throughout the paint. To properly be dispersed, pigments are usually wetted, deaggregated and deagglomerated in a vehicle. Dry pigments may be insoluble in organic solvents and water, which can necessitate wetting, deaggregation and deagglomeration before dispersion forces can take full effect and enable the production of a stable, colloidal pigmentary dispersion in the paint vehicle. The wetting or deaeration process can be physical in nature, as it may require that the vehicle or solvent displace air on the surface of the pigment particles. An ideal dispersion consists of a homogenous suspension of particles, after reducing the size of any aggregates and agglomerates.

The wetting process may be accomplished through the use of wetting agents, which typically are a type of surface-active agent or "surfactant." As discussed, wetting involves incorporation of the pigment into the vehicle replacing pigment-air interfaces with pigment-vehicle interfaces. Surfactants facilitate bringing pigments into a dispersed state as a result of surface activity at the pigment-solution interface. In general, surfactant molecules can be composed of two segregated portions, one of which can have sufficient affinity for the carrier (organic or aqueous) to bring the entire molecule into a dispersed state. The other portion can be rejected by the carrier, because it has less affinity for the carrier than the carrier molecules have for each other. If the forces rejecting this group are sufficiently strong, the surfactant molecule will tend to concentrate at an interface, so that at least part of the area of the rejected group is not in contact with the carrier molecules. While some organic carriers may be good pigment wetting agents themselves, surfactants are typically added to alkyd paints to ensure thorough pigment dispersion throughout the paint vehicle. Water-based systems are usually poor wetting agents of dry pigments, and thus, latex paints often require the addition of surfactants for pigment dispersion.

Surfactants can also be used to temporarily stabilize the pigment dispersion from re-aggregating and re-agglomerating. Problems that occur with current available colorant compositions include (i) a separation or settling of the compositions into their components over time which can require periodic remixing or stirring, and (ii) an undesirable change in rheological profile of the paint when the colorant is added, i.e., the paint becomes too thick or too thin. The latter problem is particularly present when the base paint includes an associative thickener. Also, these compositions generally do not have low levels of volatile organic compounds ("VOC"), and/or they are not universal, e.g., they are not suitable for both alkyd and latex paints or coatings. Thus, there exists a need for colorant compositions that are non-settling or non-separating, have a low VOC and provide an advantageous rheological profile.

SUMMARY

The present invention provides a universal low VOC colorant composition that may be used with both latex and alkyd paints and coatings. The colorant composition of the present invention preferably provides particularly advantageous compatibility with both types of paint systems, is substantially non-separating or settling, and provides a tinted paint that exhibits a highly desirable theological profile. The present invention provides colorant composition that may be used to make paints with extremely low levels of volatile organic compounds ("VOC").

In one embodiment, the present invention provides a low VOC colorant composition in the form of a universal colorant composition that is compatible with both latex and alkyd paints and coatings. The universal colorant compositions of the present invention include compositions which contain (i) a colorant component (e.g., a pigment, colorant, dye, tinting agent, metal effect agent, etc.); (ii) a universal surfactant package, that includes at least one alkyd-compatible surfactant; and at least one latex-compatible surfactant; and (iii) a carrier. The composition optionally includes additional additives such as, for example, a biocide; a humectant; one or more extender fillers or any combination thereof. The universal colorant compositions of the invention, with the universal surfactant package, are compatible with paints that use associative thickeners, i.e., the paint can maintain an acceptable viscosity after addition of the colorant composition.

Optional additional components for the universal colorant composition include a diluent; a dihydric or polyhydric alcohol; a polyether; a defoaming agent; carboxyl-containing polymers, such as polyacrylates and/or carboxyl-containing polyurethanes, which can function as conventional dispersing agents; and additional pigment, colorant, tinting agent or metal effect agent.

An advantage of the colorant compositions of the invention is that the compositions are very stable and preferably do not require agitation during normal shelf life. This stability allows for the packaging of the colorant in a "sealed" container (e.g:, a container that has no access port when connected to a dispenser) and allows for the accurate preparation of small tinted samples, e.g., from about 2 to 4 ounces (57 to 114 mLs). The samples can be prepared with a high degree of accuracy that will allow accurate color matching. These and other advantages of the present invention will become more apparent by referring to the detailed description and illustrative examples of the invention.

DETAILED DESCRIPTION

In one embodiment, this invention relates to a universal colorant composition (e.g., for paints and coatings). In a particularly preferred embodiment, this invention relates to a universal colorant composition for coloring solvent- and water-based paints and coatings. The universal colorant composition accomplishes pigment dispersion in these dissimilar coating formulations through the use of a universal surfactant package, e.g., a surfactant package that includes at least one alkyd-compatible surfactant and at least one latex-compatible surfactant.

One advantage of the invention includes an ability to use a single set of colorant compositions for coloring solvent- and water-based paints and coatings. Additional advantages of the color colorant compositions of the invention include improved ability to maintain its viscosity after addition of the colorant composition. Some paint and coating formulations using the inventive universal colorant composition show significantly reduced depression in viscosity when compared to the prior art. A further advantage is the virtual elimination of a VOC-contribution by the colorant to various coatings. The colorant compositions of the present invention preferably contain less than about 50 g/l VOC. More preferably, the colorant compositions of the invention contain less than about 35 g/l VOC. Most preferably, the colorant compositions of the invention contain less than about 20 g/l VOC.

The binder and the solvent collectively make what is known as the "vehicle binder" or "binder." The universal colorant composition preferably has a pigment-to-binder ratio of from about 0.5 to about 14.3. More preferably, the pigment-to-binder ratio is from about 1.0 to about 6.5. Most preferably, the pigment-to-binder ratio is from about 1.1 to about 4.0.

The colorant compositions preferably include from about 3% to about 13% of the universal surfactant package. More preferably, the colorant compositions can include from about 3% to about 22% of the universal surfactant package. Most preferably, the colorant compositions can include from about 4% to about 20% of the universal surfactant package. Most preferably, the colorant compositions can include from about 6.5% to about 18% of the universal surfactant package.

Both solvent- and water-based paints can include a binder. As used herein the term "paint" or "coating" refers to a film or a thin layer applied to a substrate, which may be clear or may contain pigment, colorant, dye, tinting agent or metal effect. The paint may be opaque or transparent (e.g., stain). Paint is a type of coating, and hereinafter, unless otherwise noted, any reference to "paint" means both paint and coating.

A latex or emulsion paint ("latex paint") is a water-based paint ranging in viscosity from a thin liquid to a semi-solid paste, consisting of a resin dispersion and a dispersion of one or more pigments, colorants, tinting agents and/or metal effect agents, plus various paint additives, such as fillers and extenders.

An organic solvent-based paint ("solvent paint" or "alkyd paint") is a uniformly-dispersed mixture ranging in viscosity from a thin liquid to a semi-solid paste and includes a polymeric binder; an organic solvent carrier; pigment, colorant, tinting agent and/or metal effect agent; and other additives. The polymeric binder can be a drying oil, natural, semi-synthetic or synthetic resin such as polyacrylate, polyurethane, modified alkyd resin or other film-forming polymer. Included as well in the binder usually is a cross-linking agent, hardener, curing agent and/or secondary resin having cross-linking ability.

For these paints, the polymeric binder or solid portion of the resin dispersion and the carrier collectively make what is known as the "vehicle."

A "pigment", usually in the form of organic or inorganic dry powder, is a substance that imparts color to another substance or mixture. A "colorant" is also a substance that imparts color to another substance or mixture, and generally includes at least one pigment and other additives. "Dyes" and "tinting agents" similarly are color-imparting agents. A "metal effect agent" is an agent that imparts metallic-type luster and associated properties to paint films. Hereinafter, unless otherwise noted, pigment, colorant, tinting agent, dye and metal effect agent will be referred to collectively as "colorant component."

The universal surfactant package will be considered to be "compatible with associative thickeners" when after addition of 0.5 gm of the universal surfactant package to 59 gm of a base paint that contains HEUR type associative thickener, the universal surfactant package will induce a viscosity drop in the paint of less than about 50%. Preferably, the addition of 0.5 gm of the universal surfactant package to 59 gm of a base paint will induce a viscosity drop in the paint or coating composition of less than about 25%. The viscosity can be measured using conventional techniques known in the art. A specific instrument for measuring the viscosity is a Cap Viscometer, Model 2000, available from Brookfield Engineering Laboratories Middleboro, Mass., USA.

The colorant compositions of the present invention will be considered to be "compatible with associative thickeners" when after addition of 12 ounces of the colorant composition(s) to 1 gallon of a base paint that contains HEUR type associative thickener, the colorant composition(s) will induce a viscosity drop in the paint of less than about 20 KU's. Preferably, the addition of about 12 ounces of the colorant composition(s) to 1 gallon of a base paint will induce a viscosity drop in the paint or coating composition of less than about 15 KU's. The viscosity can be measured using conventional techniques known in the art. A specific instrument for measuring the viscosity is a Brookfield KU–1+ Viscometer, available from Brookfield Engineering Laboratories Middleboro, Mass., USA.

In one embodiment the colorant compositions are substantially free of alkylphenol ethoxylate surfactants (APE). These surfactants are usually made from a branched-chain nonylphenol or octylphenol, which is reacted with ethylene oxide. Substantially free of APE refers to compositions having less than 0.5% APE. Preferably, the compositions will have less than 0.1% APE.

Preferred colorant compositions of the present invention provide a single set of colorant formulations for use with either alkyd or latex paints. The colorant compositions of the invention are uniform and do not require mixing prior to use, even after extended shelf-life. The typical "shelf-life" for the colorant compositions of the present invention is about two years. The compositions are tested for extended, "shelf-life" stability by heating a sample of the colorant composition at 122° F. (50° C.) for 6 weeks. After the heating period, the colorant composition is evaluated for changes in viscosity and compatibility in both alkyd and latex base paints. A composition is considered stable if, after the heating period, the composition has a viscosity increase of less than about 15 KU. Preferably, the compositions will have a viscosity increase of less than about 10 KU. More preferably, the compositions will have a viscosity increase of less than about 5 KU. A specific instrument for measuring the viscosity is a Brookfield KU-1+ Viscometer, available from Brookfield Engineering Laboratories Middleboro, Mass., USA.

The compositions of the present invention can be provided in sealed pouches wherein the colorant composition can be readily dispensed in controlled amounts. The pouches allow for the use of the colorant composition with a minimum of waste.

Preferred universal colorant compositions include a suitable universal surfactant package that includes at least one alkyd-compatible surfactant; and at least one latex-compatible surfactant.

Examples of suitable alkyd-compatible surfactants include surfactants such as, for example, bis(tridecyl)ester of sodium sulfosuccinic acid(anionic) (Aerosol TR-70S), Lecithin, Lecithin without residual oil (Dry Lecithin), Lecithin with a nonionic surfactant (W/D Lecithin), fatty acid modified polyesters (EFKA 6220), nonyl phenol ethoxylates (Igepal CO 430 and Igepal CO 530), linear alcohol ethoxylates (L-12-3 and L-24-4), alkyl polyethylene glycol ethers formed from a C10-alcohol and ethylene oxide (Lutensol XP40 and Lutensol XP50), ethylene oxide/propylene oxide block copolymer (Pluronic L64), Secondary alcohol ethoxylates (Tergitol 15-S-3 and Tergitol 15-S-5), tetrafunctional ethylene oxide/propylene oxide block copolymer, nonionic (Tetronic 901 and Tetronic 90R4), Alkyl aryl polyether alcohol with nonionic solubilizer (Triton X-207), NPE Phosphate ester, anionic (Dextrol OC-50), alkyl ammonium salts of low molecular weight polycarboxylic acid polymers (Disperbyk), dinonyl sulfosuccinate (Nekal 25L), difunctional propylene oxide/ethylene oxide block copolymer (with secondary —OH groups) (Pluronic 25R4), APE dodoxynol-6 (RC-520), and the like. Many of these surfactants are available in a commercial form. The commercial names are listed in parenthesis, herein above.

Presently preferred alkyd-compatible surfactants include for example, bis(tridecyl)ester of sodium sulfosuccinic acid (anionic) (Aerosol TR-70S), Lecithin, Lecithin w/o residual oil (Dry Lecithin), Lecithin with a nonionic surfactant (W/D Lecithin), secondary alcohol ethoxylates (Tergitol 15-S-3 and Tergitol 15-S-5), Linear alcohol ethoxylates (L-12-3), alkyl aryl polyether alcohol with nonionic solubilizer (Triton X-207), alkyl polyethylene glycol ethers formed from a C10-alcohol and ethylene oxide (Lutensol XP50), and the like.

Examples of suitable latex-compatible surfactants include surfactants such as, for example, NPE Phosphate ester, anionic (Dextrol OC-50), alkyl ammonium salts of low molecular weight polycarboxylic acid polymers (Disperbyk), nonyl phenol ethoxylates (Igepal CO 530 and Igepal CO-630), alkyl polyethylene glycol ethers formed from a C10-alcohol and ethylene oxide (Lutensol XP50 and Lutensol XP60), dinonyl sulfosuccinate (Nekal 25L), difunctional propylene oxide/ethylene oxide block copolymer (with secondary —OH groups) (Pluronic 25R4), APE dodoxynol-6 (RC-520), Secondary alcohol ethoxylates (Tergitol 15-S-5), nonionic polyethylene thioethers, (Alcodet 218), modified polyalkoxylates with groups having acidic affinity (BYK 2091), dodecyl phenol ethoxylates (DD-10), high molecular weight block copolymers with groups having basic affinity (Disperbyk 184), preneutralized acrylic polymers, (EFKA 4580), alkylaryl polyglycol ethers (Emulsifier W), anionic polyelectrolyte sodium salts of polycarboxylic acids (Hydropalat 44), blend of NPE and sodium salt of Dibutylnaphthalene Sulfonate (Igepal CTA-639W), hydrophobic copolymer of polycarboxylic acid (Nopcosperse 100), propylene oxide/ethylene oxide difunctional block copolymer (with secondary —OH groups) (Pluronic 17R4 or Pluronic 25R4), ethylene oxide/propylene oxide block copolymer (Pluronic L44, Pluronic L64, and Pluronic F68), PEG 40 hydrogenated Caster oil (Surfactol 365), surfactant blends (Surfynol CT-121), salts of hydrophilic or hydrophobic copolymers of polycarboxylic acid (Tamol 1124, Tamol 731, Tamol 681or Tamol 165), low foaming nonionic surfactant such as Triton CF-10, and the like. Many of these surfactants are available in a commercial form. The commercial names are listed in parenthesis, herein above.

Presently preferred latex-compatible surfactants include for example, alkyl polyethylene glycol ethers formed from a C10-alcohol and ethylene oxide (Lutensol XP50 and Lutensol XP60), secondary alcohol ethoxylates (Tergitol 15-S-5 and Tergitol 15-S-9), propylene oxide/ethylene oxide difunctional block copolymer (with secondary —OH groups) (Pluronic 17R4), ethylene oxide/propylene oxide block copolymer (Pluronic L44),alkylaryl polyglycol ethers (Emulsifier W), amine salts of hydrophylic copolymers of polycarboxylic acid (Tamol 731), and the like.

Non-limiting examples of universal surfactant packages are Lecithin, Tamol 731, and Tergitol 15-S-5; Dry Lecithin, Aerosol TR70S, SMA1440H, Pluronic 17R4, and Lutensol XP50; Dry Lecithin, Aerosol TR70S, SMA1440H, and Pluronic 17R4; Lecithin, Pluronic 17R4, and Lutensol XP50; Tamol 731, Dry Lecithin, and Pluronic L35; Dry Lecithin, Lecithin, Lutensol XP50, Tergitol 15-S-5, and Pluronic 17R4; and Tamol 731, Dry Lecithin, and Pluronic L44.

The colorant composition preferably includes a carrier, a colorant component and a universal surfactant package. Optional additional components for the colorant composition include additional colorant components, diluent, a base, a humectant (e.g., a polyether), a biocide, a defoaming agent and carboxyl-containing polymers, such as polyacrylates, and/or carboxyl-containing polyurethanes, which can function as conventional dispersing agents.

The colorant composition of the present invention is generally compatible with and may be used for both alkyd and latex paints. While not intending to be bound by theory, it is useful with both alkyd and latex paints because the alkyd-compatible surfactant provides lipophilic properties, and the latex-compatible surfactant provides hydrophilic properties, allowing it to disperse pigment in both organic carrier and water, respectively.

Pigments for use in the colorant compositions of the present invention are known in the art. Suitable pigments include titanium dioxide white, carbon black, lampblack, black iron oxide, red iron oxide, transparent red oxide, yellow iron oxide, transparent yellow oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, and/or organic yellows (such as monoazo yellow).

The polyether component is optional, such that at least one alkyd-compatible surfactant and at least one latex-compatible surfactant is sufficient for the universal surfactant package of the invention. The polyether component, however, is an especially preferred optional component for dilution and polar-control of the dispersant formulation. The classes of compounds encompassed by the polyether include polyalkyl glycols, such as low to moderate molecular weight polyethylene and polypropylene glycols; polyhydroxy ethers, such as those formed from epoxide polymerization; polysaccharide compounds, such as polysorbitan and polysorbitol; and polyalkylene oxides, such as polyethylene and polypropylene oxide.

Rather than using a polyether, a dihydric or polyhydric alcohol may be employed. Ethylene glycol is an exemplary dihydric alcohol. (Ethylene glycol is a VOC and as such is not preferred in practicing the invention.) Propylene glycol is an exemplary polyhydric alcohol.

Polyethers suitable for practicing the present invention include linear ethylene glycol polyethers of low molecular weight, e.g., having a molecular weight of from 190 to 210 g and medium molecular weight polyethylene glycols, e.g., having a molecular weight of from 285 to315 g. Medium molecular weight polyethylene glycols are advantageous for use as vehicle because they are substantially free of very low molecular weight volatile organic solvents, which are suspected toxins and/or teratogens.

Preferably, suitable ethylene glycol polyethers have an average molecular weight of from about 190 to about 800. More preferably, the polyethylene glycol polyethers have a molecular weight from about 275 to about 325. Most preferably, the polyethylene glycol polyethers have a molecular weight from about 285 to about 315. Particularly useful commercial polyethylene glycols are PEG 300 or PEG 400.

Another useful optional additive is a humectant such as, for example, the humectant GRB-2 from Zenica, which contains glycerin and a nonionic surfactant. Additional humectants useful in practicing the present invention include materials such as, for example, glycols such as ethylene glycol, propylene glycol, hexylene glycol, and the like; polyethylene glycols having molecular weights of about 300, 400, 500, and the like; polypropylene glycols having molecular weights of about 300, 400, 500, and the like; glycerin, sorbitol, sodium polyglutamate, modified urea compounds, polyethylene oxide and ethoxylated surfactants, and the like.

A thickener or multiple thickeners may be also used to increase the overall viscosity of the colorant compositions. The thickener or thickeners should be about zero to about 5% by weight of the colorant composition. Exemplary thickeners include cellulose ethers; carboxymethyl cellulose; alginates; caseinates; hydrophobically-modified cellulose ethers; polyethylene oxide; polyvinyl alcohol; polyacrylamide; alkali-soluble acrylics and styrene/maleic anhydrides; alkali-swellable crosslinked acrylic emulsions, such as hydrophobically-modified alkali-swellable emulsions; and nonionic associative thickeners, such as hydrophobically-modified polyurethanes and polyethers. Thickeners for alkyd-compatible surfactants include bentonite clays, organoclays, synthetic silicas, castor oil derivatives, modified acrylic copolymers, polyethylene glycol, polymerized oil derivatives, organic esters, and complex polyolefins.

A defoaming agent may be added for ease of manufacture. Defoamers useful in practicing the present invention include materials such as, for example, mineral oil, silica oil (Drew L-474), organically modified silicone oils (Drew L-405), and the like.

A biocide may also be added to the colorant compositions of the present invention to eliminate or inhibit the growth of microorganisms. The biocide will generally account for between 0 and 1% by weight of the colorant composition. Biocidal chemicals include chlorinated hydrocarbons, organometallics, halogen-releasing compounds, metallic salts, organic sulfur compounds, quaternary ammonium compounds and phenolics. Useful commercial biocide examples are Troysan 192, Kathon LS, and the like.

A fungicide may also be added to the colorant compositions of the present invention to eliminate or inhibit the growth of microorganisms. Non-limiting examples of fungicides include compounds such as, for example, 3-Iodo-2-propynyl butyl carbamate (IPBC), chlorothalonil, Zinc Pyrithione, 2-N-octyl-4-isothiazalin-3-one, and the like. A preferred fungicide is IPBC.

Water may also be added to the colorant compositions of the present invention. Generally, water may make up between about 0 and 75% by weight of the colorant composition, depending on the particular colorant composition.

In another embodiment of the present invention, a colorant composition (e.g., a standard colorant or a colorant composition of the present invention) is provided in an easy to use container. Suitable cartridge-style containers for use with colorant compositions include "tubes," "syringes," and "caulking"-type cartridges. In a specific embodiment the colorant compositions can be provided in sealed pouches wherein the colorant composition can be readily dispensed in controlled amounts. These containers are preferred over traditional cans and jars. More preferably, the sealed pouches or containers have a nozzle or adapter orifice that facilitates clean entry of the composition into the tinting machine. In one embodiment the pouches are provided in boxes for ease of storage and use.

Suitable containers for use in the present invention include metal and plastic tubes (e.g., "toothpaste" style tubes), sealed plastic bags or pouches and caulking-tube cartridges (e.g., cartridges with plungers such as are described, for example, in U.S. Pat. Nos. 5,622,288; 5,560,521; and 5,297,697, which are herein incorporated by reference).

The merits of the colorant compositions of the present invention are further illustrated in the following examples. The universal colorant compositions can be combined with organic solvent-based or water-based paints to provide colored paints.

EXAMPLES

In the Examples 1 through 9 below, the universal colorant compositions were made according to the present invention. Specifically, pigments were dispersed into a vehicle containing water, defoaming agent, biocide, ammonium hydroxide, PEG 300, universal surfactant package, optional fungicide, and thickener.

Example 1

Magenta

| Ingredient | Parts (by weight) |
| --- | --- |
| Water | 100.87 |
| PEG300 | 11.55 |
| Biocide | 0.83 |
| Ammonium Hydroxide | 0.25 |
| Lecithin | 14.51 |
| Lutensol XP50 | 5.88 |
| Pluronic 17R4 | 5.88 |
| Magenta Pigment | 22.15 |

-continued

| Ingredient | Parts (by weight) |
| --- | --- |
| extender Pigment | 17.93 |
| Fungicide | 0.15 |
| extender paste | 30 |

| | |
| --- | --- |
| pH | 8.5 |
| Pigment/Binder ratio | 1.33 |

Example 2

Black

| Ingredient | Parts (by weight) |
| --- | --- |
| Water | 724.71 |
| PEG300 | 169.02 |
| Thickener | 5.50 |
| biocide | 13.00 |
| defoamer | 5.00 |
| Ammonium Hydroxide | 4.00 |
| Dry Lecithin | 45.00 |
| Lecithin | 66.00 |
| Lutensol XP50 | 151.00 |
| Pluronic 17R4 | 151.00 |
| Tergitol 15-S-5 | 72.00 |
| Black Pigment | 300.00 |
| extender Pigment | 100.00 |
| fungicide | 2.00 |
| extender paste | 1520.13 |

Example 3

Red Oxide

| Ingredient | Parts (by weight) |
| --- | --- |
| Water | 255.3 |
| PEG300 | 174.8 |
| Biocide | 1.52 |
| Ammonium Hydroxide | 5 |
| Dry Lecithin | 26.8 |
| Tamol 731 | 16.4 |
| Pluronic L 35 | 80 |
| Red Oxide Pigment | 1080 |
| Fungicide | 7 |
| extender paste | 305 |

| | |
| --- | --- |
| pH | 8.5 |
| Pigment/Binder ratio | 4.05 |
| Pigment % by Wt. | 64.6 |

Example 4

Organic Yellow

| Ingredient | Parts (by weight) |
| --- | --- |
| Water | 5043.27 |
| PEG300 | 731.73 |
| Biocide | 52.78 |

-continued

| Ingredient | Parts (by weight) |
| --- | --- |
| Ammonium Hydroxide | 9.62 |
| Defoamer | 20.23 |
| Rhodafac LO-529 | 299.49 |
| Aerosol TR-70 | 212.88 |
| Lutensol XP50 | 534.53 |
| Pluronic 17R4 | 534.23 |
| Hansa Yellow Pigment | 2154.72 |
| extender Pigment | 2790.12 |
| Fungicide | 9.47 |
| extender paste | 2385.24 |

| | |
| --- | --- |
| pH | 8 |
| Pigment/Binder ratio | 2.38 |
| Pigment % by Weight | 42.4 |

Example 5

Phthalo Green

| Ingredient | Parts (by weight) |
| --- | --- |
| Water | 693.41 |
| PEG300 | 137.68 |
| Biocide | 10.45 |
| Defoamer | 3.2 |
| Ammonium Hydroxide | 3 |
| Lecithin | 125.2 |
| Lutensol XP50 | 120.2 |
| Pluronic 17R4 | 60.1 |
| Phthalo Green pigment PG7 | 287.53 |
| extender Pigment | 261.4 |
| Fungicide | 6 |
| extender paste | 796.65 |

| | |
| --- | --- |
| pH | 8.5 |
| Pigment/Binder ratio | 1.76 |
| Pigment % by Weight | 39.8 |

Example 6

Phthalo Blue

| Ingredient | Parts (by weight) |
| --- | --- |
| Water | 724.71 |
| PEG300 | 159.63 |
| Biocide | 12.34 |
| Defoamer | 4 |
| Ammonium Hydroxide | 2.24 |
| Lecithin | 56 |
| Lutensol XP50 | 84 |
| Pluronic 17R4 | 84 |
| Blue Pigment PB15:3 | 198 |
| extender Pigment | 550 |
| Fungicide | 2 |
| extender paste | 1035.65 |

| | |
| --- | --- |
| pH | 8 |
| Pigment/Binder ratio | 2.9 |
| Pigment % by Weight | 46.25 |

Example 7

Organic Red

| Ingredient | Parts (by weight) |
| --- | --- |
| Water | 725.64 |
| PEG300 | 137.49 |
| Biocide | 9.88 |
| Defoamer | 5.95 |
| Ammonium Hydroxide | 2.98 |
| Lecithin | 162.49 |
| Lutensol XP50 | 50 |
| Pluronic 17R4 | 50 |
| Naphthol red, Quinacridone red pigments | 197.37 |
| extender Pigment | 114.4 |
| Fungicide | 2.73 |
| extender paste | 1041 | pH 8
Pigment/Binder ratio 1.56
Pigment % by Weight 35.54

Example 8

Brown Oxide

| Ingredient | Parts (by weight) |
| --- | --- |
| Water | 466.48 |
| Thickener | 5 |
| PEG300 | 253.53 |
| Biocide | 5 |
| Ammonium Hydroxide | 6 |
| Dry Lecithin | 150 |
| Tamol 731 | 50 |
| Pluronic L 44 | 89 |
| Red Oxide Pigment | 1050 |
| Yellow Oxide Pigment | 300 |
| Fungicide | 3 |
| extender paste | 830.77 |
| black shader 8091 | 945 | pH 8
Pigment/Binder ratio 2.82
Pigment % by Weight 53.02

Example 9

Medium Yellow

| Ingredient | Parts (by weight) |
| --- | --- |
| Water | 4400.61 |
| PEG300 | 745.9 |
| Biocide | 53.8 |
| Defoamer | 32.18 |
| Ammonium Hydroxide | 0 |
| Dry Lecithin | 204.64 |
| Lutensol XP50 | 353.98 |
| Pluronic 17R4 | 353.98 |
| Emulsifier W | 408.43 |
| Aerosol TR-70 | 217.84 |
| PY74 | 1116.4 |

| Ingredient | Parts (by weight) |
| --- | --- |
| PY65 | 3342.7 |
| extender Pigment | 0 |
| Fungicide | 9.65 |
| extender paste | 2379.87 | pH 8
Pigment/Binder ratio 2.21
Pigment % by Weight 42.42

In Examples 10 through 21, some of the above colorant compositions were added to latex and alkyd bases to test compatibility and performance. The colorant compositions were added volumetrically, depending on the base used.

Latex Base Formulation

A mixture of water, propylene glycol, AMP-95, Tamol 1124, Tamol 165, NP-9. defoamer, RM 12W, and $TiO_2$, was prepared. To this mixture the following ingredients were sequentially added: acrylic latex, additional defoamer, additional water, Texanol, Triton CA, RM2020, propylene glycol, and defoamer. This provided a base paint suitable for testing the colorants for compatibility and viscosity. The specific amounts are provided in Table 1.

TABLE 1

| Ingredient | Parts (by weight) |
| --- | --- |
| Water | 66.64 |
| Propylene glycol | 8.62 |
| AMP-95 | 2.94 |
| Tamol 1124 | 4.98 |
| Tamol 165 | 2.20 |
| NP-9 | 2.18 |
| defoamer | 2.06 |
| RM 12W | 2.16 |
| $TiO_2$ | 80.00 |
| acrylic latex | 634.67 |
| defoamer | 1.06 |
| Water | 58.31 |
| Texanol | 31.00 |
| Triton CA | 2.07 |
| RM2020 | 17.19 |
| Propylene glycol | 8.62 |
| Defoamer | 1.06 |
| TOTAL | 925.76 |

Using the colorant compositions disclosed in examples 1-10, and the formulation above, the following tinted paints were prepared and the viscosity determined. The results are in Table 2.

TABLE 2

| Example | Color | Viscosity Base | Viscosity Tinted | Viscosity Change |
| --- | --- | --- | --- | --- |
| 10 | Organic yellow | 107 KU | 92 KU | 15 |
| 11 | Black | 105 KU | 90 KU | 15 |
| 12 | Yellow oxide | 103 KU | 88 KU | 15 |
| 13 | Phthalo green | 109 KU | 107 KU | 2 |
| 14 | Phthalo blue | 107 KU | 98 KU | 9 |
| 15 | EE | 109 KU | 102 KU | 7 |
| 16 | Red oxide | 105 KU | 90.3 KU | 14.7 |
| 17 | Brown oxide | 103 KU | 96 KU | 7 |
| 18 | Raw umber | 103 KU | 88 KU | 15 |
| 19 | Magenta | 107 KU | 96 KU | 11 |
| 20 | Organic red | 107 KU | 92 KU | 15 |
| 21 | Medium yellow | 103 KU | 87 KU | 16 |

The above specification, examples and data provide a complete description of the manufacture and use of the composition of the invention. Since many embodiments of the invention can be made without departing from the spirit and scope of the invention, the invention resides in the claims hereinafter appended.

All patents, patent applications, and literature cited in the specification are hereby incorporated by reference in their entirety. In the case of any inconsistencies, the present disclosure, including any definitions therein will prevail.

What is claimed is:

1. A colorant composition, comprising:
   a colorant component;
   a universal surfactant package, comprising at least one alkyd-compatible surfactant; and at least one latex-compatible surfactant; and
   a carrier;
   wherein the composition optionally includes additional additives selected from the group consisting of a biocide; a humectant; one or more extender fillers and any combination thereof;
   wherein the universal surfactant package is compatible with paints that use associative thickeners; and
   wherein the composition is in the form of a liquid universal colorant composition that is compatible with both latex and alkyd paints.

2. The colorant composition of claim 1, wherein the composition contains less than 50 g/l VOC.

3. The colorant composition of claim 2, wherein the composition contains less than 35 g/l VOC.

4. The colorant composition of claim 3, wherein the composition contains less than 20 g/l VOC.

5. The colorant composition of claim 1, wherein the composition comprises the colorant component, the carrier, and a solid portion as the binder, and the colorant-to-binder ratio is from 0.5 to 14.3.

6. The colorant composition of claim 5, wherein the colorant-to-binder ratio is from 1.0 to 6.5.

7. The colorant composition of claim 6, wherein the colorant-to-binder ratio is from 1.1 to about 4.0.

8. The colorant composition of claim 1, wherein the universal surfactant package constitutes between 3 and 22 wt. % of the composition.

9. The colorant composition of claim 8, wherein the universal surfactant package constitutes between 4 and 20 wt. % of the composition.

10. The colorant composition of claim 9, wherein the universal surfactant package constitutes between 6.5 and 18 wt. % of the composition.

11. The colorant composition of claim 1, wherein the alkyd-compatible surfactant comprises bis(tridecyl)ester of sodium sulfosuccinic acid, lecithin, dry lecithin, fatty acid modified polyester, nonyl phenol ethoxylate, linear alcohol ethoxylate, alkyl polyethylene glycol ether, ethylene oxide/propylene oxide block copolymer, secondary alcohol ethoxylate, nonionic tetrafunctional ethylene oxide/propylene oxide block copolymer, alkyl aryl polyether alcohol with nonionic solubilizer, anionic nonyl phenol ethoxylate phosphate ester, alkyl ammonium salt of low molecular weight polycarboxylic acid polymer, or difunctional propylene oxide/ethylene oxide block copolymer having secondary —OH groups.

12. The colorant composition of claim 1, wherein the alkyd-compatible surfactant comprises bis(tridecyl)ester of sodium sulfosuccinic acid, lecithin, dry lecithin, water dispersible lecithin, secondary alcohol ethoxylate, linear alcohol ethoxylate, alkyl aryl polyether alcohol with nonionic solubilizer, dodecyl phenol ethoxylate, dinonyl sulfosuccinate or alkyl polyethylene glycol ethers.

13. The colorant composition of claim 1, wherein the latex-compatible surfactant comprises nonyl phenol ethoxylate phosphate ester, alkyl ammonium salt of low molecular weight polycarboxylic acid polymer, nonyl phenol ethoxylate, alkyl polyethylene glycol ether, difunctional propylene oxide/ethylene oxide block having secondary —OH groups, secondary alcohol ethoxylate, nonionic polyethylene thioether, modified polyalkoxylate with groups having acidic affinity, dodecyl phenol ethoxylate, high molecular weight block copolymer, preneutralized acrylic polymer, alkylaryl polyglycol ether, anionic polyelectrolyte sodium salt of polycarboxylic acid, hydrophobic copolymer of polycarboxylic acid, propylene oxide/ethylene oxide difunctional block copolymer having secondary —OH groups, ethylene oxide/propylene oxide block copolymer, a surfactant blend, or an amine salt of a hydrophilic copolymer of polycarboxylic acid.

14. The colorant composition of claim 1, wherein the latex-compatible surfactant comprises an alkyl polyethylene glycol ether formed from a C10-alcohol and ethylene oxide, secondary alcohol ethoxylate, propylene oxide/ethylene oxide difunctional block copolymer having secondary —OH groups, ethylene oxide/propylene oxide block copolymer, alkylaryl polyglycol ether, dodecyl phenol ethoxylate, blend of nonylphenol ethoxylate and sodium salt of dibutylnaphthalene sulfonate, dinonyl sulfosuccinate, polyethylene glycol 40 hydrogenated Caster oil, or amine salt of a hydrophilic copolymer of polycarboxylic acid.

15. The colorant composition of claim 1, wherein the colorant component is an organic or inorganic pigment, colorant, dye, tinting agent, metal effect agent, or any combination thereof.

16. The colorant composition of claim 15, wherein the pigment is selected from the group consisting of titanium dioxide white, carbon black, lampblack, black iron oxide, red iron oxide, transparent red oxide, yellow iron oxide, transparent yellow oxide, brown iron oxide, phthalocyanine green, phthalocyanine blue, naphthol red, quinacridone red, quinacridone magenta, quinacridone violet, DNA orange, organic yellows and any combination thereof.

17. The colorant composition of claim 1, further comprising humectant.

18. The colorant composition of claim 17, wherein the humectant is a dihydric or polyhydric alcohol.

19. The colorant composition of claim 18, wherein the humectant is a polyether.

20. The colorant composition of claim 19, wherein the polyether comprises a polyalkyl glycol, polyhydroxyether, polysaccharide, modified polyurea, or polyalkylene oxide.

21. The colorant composition of claim 20, wherein the polyether comprises a polyethylene glycol or polypropylene glycol and has a molecular weight between about 190 and about 800.

22. The colorant composition of claim 21, wherein the polyether is polyethylene glycol having a molecular weight between 190 and 800.

23. The colorant composition of claim 22, wherein the polyether is polyethylene glycol having a molecular weight between 275 and 325.

24. The colorant composition of claim 20, wherein the polyether is polyethylene glycol having a molecular weight between 285 and 315.

25. The colorant composition of claim 20, wherein the polyether is polyethylene glycol 300 or polyethylene glycol 400.

26. The colorant composition of claim 1, wherein the composition has less than 0.5% of alkylphenol ethoxylate surfactants (APE).

27. The colorant composition of claim 26, wherein the composition has less than 0.1% of alkylphenol ethoxylate surfactants (APE).

28. The colorant composition of claim 1, wherein the composition is stable and does not require agitation prior to use.

29. The colorant composition of claim 1, wherein after heating at 122° F. (50° C.) for 6 weeks the composition has a viscosity increase of less than 15 KU.

30. The colorant composition of claim 29, wherein after heating at 122° F. (50° C.) for 6 weeks the composition has a viscosity increase of less than 10 KU.

31. The colorant composition of claim 30, wherein after heating at 122° F. (50° C.) for 6 weeks the composition has a viscosity increase of less than 5 KU.

32. A paint or coating comprising
a) the colorant composition of claim 1; and
b) a base paint;
wherein after addition of the colorant composition the paint will have a viscosity drop (change) of 20 KU's.

33. The paint or coating comprising of claim 32, wherein after addition of the colorant composition the paint will have a viscosity drop of less than 15 KU's.

34. The colorant composition of claim 1, consisting essentially of the colorant component; the at least one alkyd-compatible surfactant; the at least one latex-compatible surfactant; the carrier; and the additives.

* * * * *

UNITED STATES PATENT AND TRADEMARK OFFICE
CERTIFICATE OF CORRECTION

| | |
|---|---|
| PATENT NO. | : 7,659,340 B2 |
| APPLICATION NO. | : 11/384176 |
| DATED | : February 9, 2010 |
| INVENTOR(S) | : Coward et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 416 days.

Signed and Sealed this

Thirtieth Day of November, 2010

David J. Kappos
*Director of the United States Patent and Trademark Office*